United States Patent
Himmelmann (10) Patent No.: US 12,060,799 B2
(45) Date of Patent: Aug. 13, 2024

(54) TURBINE THERMAL ISOLATION SYSTEM FOR MICRO-TURBINE ALTERNATOR

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 200 days.

(21) Appl. No.: 17/711,664

(22) Filed: Apr. 1, 2022

(65) Prior Publication Data
US 2023/0313736 A1    Oct. 5, 2023

(51) Int. Cl.
| F01D 15/10 | (2006.01) |
| F01D 25/12 | (2006.01) |
| H02K 5/20 | (2006.01) |
| H02K 7/18 | (2006.01) |

(52) U.S. Cl.
CPC ............ *F01D 15/10* (2013.01); *F01D 25/12* (2013.01); *F01D 25/125* (2013.01); *H02K 5/207* (2021.01); *H02K 7/1823* (2013.01); *F05D 2220/76* (2013.01); *H02K 2205/03* (2013.01)

(58) Field of Classification Search
CPC ........ F01D 15/10; F01D 25/12; F01D 25/125; H02K 5/207; H02K 7/1823; H02K 2205/03; F05D 2220/76; F05D 2220/768; F05D 2250/82; F02C 6/206
See application file for complete search history.

(56) References Cited

U.S. PATENT DOCUMENTS

| 4,069,673 A | 1/1978 | Lapeyre |
| 4,531,357 A * | 7/1985 | Weber ..................... F02C 7/185 |
| | | 60/39.83 |
| 4,725,206 A * | 2/1988 | Glaser .................. F02B 39/005 |
| | | 417/407 |
| 6,787,933 B2 | 9/2004 | Claude et al. |
| | (Continued) | |

FOREIGN PATENT DOCUMENTS

| EP | 4159990 A2 | 4/2023 |
| WO | 2017063907 A1 | 4/2017 |

OTHER PUBLICATIONS

European Search Report for Application No. 23165703.2, mailed Aug. 7, 2023, 7 pages.

*Primary Examiner* — Jesse S Bogue
(74) *Attorney, Agent, or Firm* — CANTOR COLBURN LLP (57) ABSTRACT

An electrical power generation system including: a micro-turbine alternator, including: a decomposition chamber; a turbine including blades driven by combustion gases from the decomposition chamber; a blower operably connected to the decomposition chamber to provide a blown airflow thereto; one or more shafts connecting the turbine to the blower such that rotation of the turbine drives rotation of the blower; an electric generator disposed along the one or more shafts such that electrical power is generated via rotation of the one or more shafts; and a housing enclosing the electric generator within a generator cavity formed therein. The blower is configured to blow air through the generator cavity through or around the electric generator. The air is configured to exit the generator cavity to enter the turbine.

17 Claims, 7 Drawing Sheets

(56) References Cited

U.S. PATENT DOCUMENTS

| | | | |
|---|---|---|---|
| 7,521,815 B2* | 4/2009 | Lee | F01D 25/22 |
| | | | 290/52 |
| 8,174,141 B2 | 5/2012 | Delf | |
| 8,491,271 B2* | 7/2013 | Jennes | F01D 5/025 |
| | | | 416/213 R |
| 10,655,532 B2* | 5/2020 | Jacob | H02K 9/06 |
| 11,136,986 B2* | 10/2021 | Dozzini | F04D 17/122 |
| 11,177,489 B2* | 11/2021 | Sakota | H02K 9/06 |
| 11,377,979 B2* | 7/2022 | Ikeya | F02B 39/16 |
| 2002/0149205 A1 | 10/2002 | Gilbreth et al. | |
| 2015/0008771 A1* | 1/2015 | Lee | F04D 29/053 |
| | | | 310/62 |
| 2016/0201724 A1* | 7/2016 | Ross | F16C 33/586 |
| | | | 384/504 |
| 2020/0325904 A1 | 10/2020 | Himmelmann | |
| 2022/0320945 A1* | 10/2022 | Yazaki | F01D 25/183 |

* cited by examiner

TURBINE THERMAL ISOLATION SYSTEM FOR MICRO-TURBINE ALTERNATOR

BACKGROUND

The embodiments herein generally relate to micro-turbine alternators and more specifically, an apparatus and a method of reducing thermal exposure of an electric generator from heat generated by a turbine of a micro-turbine alternator.

Some systems, such as unmanned aerial vehicles (UAV's) or the like often utilize electrical power for propulsion and operation of onboard systems. Some such systems, such as medium-sized UAV's that require power levels in the range of about 1 KW to 30 KW, have relatively short mission times because the energy density of batteries is far too low to effectively work in this power range, and conventional internal combustion engines and jet engines are very inefficient at these low power levels. One option that has been developed is a tethered UAV system in which the UAV is connected to a power source on the ground by a tether. Use of a tethered UAV allows for an increase in mission duration time, but reduces an operating height and distance in which the UAV may operate, due to the constraint of the tether. An untethered efficient power source that is lightweight with a high power density is greatly desired.

BRIEF SUMMARY

According to one embodiment, an electrical power generation system is provided. The electrical power generation system including: a micro-turbine alternator, including: a decomposition chamber; a turbine including blades driven by combustion gases from the decomposition chamber; a blower operably connected to the decomposition chamber to provide a blown airflow thereto; one or more shafts connecting the turbine to the blower such that rotation of the turbine drives rotation of the blower; an electric generator disposed along the one or more shafts such that electrical power is generated via rotation of the one or more shafts; and a housing enclosing the electric generator within a generator cavity formed therein. The blower is configured to blow air through the generator cavity through or around the electric generator. The air is configured to exit the generator cavity to enter the turbine.

In addition to one or more of the features described above, or as an alternative, further embodiments may include that the housing further includes: a forward housing end; an aft housing end; a cap at the forward end; an aft housing located at the aft end; and a forward housing interposed between the cap and the aft housing. The forward housing and the aft housing align to form the generator cavity.

In addition to one or more of the features described above, or as an alternative, further embodiments may include that the forward cap is in a facing spaced relationship with the forward housing forming a radial air passage therebetween, the radial air passage being configured to receive air from the blower.

In addition to one or more of the features described above, or as an alternative, further embodiments may include that the forward housing further includes a plurality of forward cooling holes, the plurality of forward cooling holes fluidly connect the radial air passage to the generator cavity.

In addition to one or more of the features described above, or as an alternative, further embodiments may include a forward journal bearing. The radial air passage is fluidly connected to the generator cavity through the forward journal bearing.

In addition to one or more of the features described above, or as an alternative, further embodiments may include that the aft housing further includes: a plurality of radially inner aft cooling holes; and a plurality of radially outer aft cooling holes, radially outward from the plurality of radially inner aft cooling holes.

In addition to one or more of the features described above, or as an alternative, further embodiments may include an inner turbine cavity shaped to direct the air into the blades of the turbine. The inner turbine cavity is fluidly connected to the plurality of radially inner aft cooling holes.

In addition to one or more of the features described above, or as an alternative, further embodiments may include a turbine shaft attached to the turbine, the turbine shaft including: a turbine shaft disc; and a turbine thermal conduction choke located between the turbine shaft disc and the turbine. The turbine thermal conduction choke has a smaller outer diameter than remaining portions of the turbine shaft, the turbine shaft disc, and the turbine.

In addition to one or more of the features described above, or as an alternative, further embodiments may include that the turbine, the turbine shaft disc, and the turbine thermal conduction choke form a turbine neck cavity. The inner turbine cavity is shaped to direct the air into the turbine neck cavity.

In addition to one or more of the features described above, or as an alternative, further embodiments may include: a turbine nozzle housing; a nozzle housing thermal conduction choke fluidly connected to the plurality of radially inner aft cooling holes, the nozzle housing thermal conduction choke including a wall abutting the turbine nozzle housing. The wall is thermally connected to the turbine nozzle housing. The nozzle housing thermal conduction choke is shaped to direct at least a portion of the air from the plurality of radially inner aft cooling holes to flow across the wall.

In addition to one or more of the features described above, or as an alternative, further embodiments may include a second journal bearing. The inner turbine cavity is fluidly connected to the generator cavity through the second journal bearing.

In addition to one or more of the features described above, or as an alternative, further embodiments may include that the turbine shaft passes through the electric generator to attach to the blower.

In addition to one or more of the features described above, or as an alternative, further embodiments may include that the turbine shaft passes through a rotor element of the electric generator to attach to the blower.

In addition to one or more of the features described above, or as an alternative, further embodiments may include a transfer tube located radially outward of the rotor element and radially inward of a stator element of the electric generator, the transfer tube extending between the blower and the turbine shaft disc.

In addition to one or more of the features described above, or as an alternative, further embodiments may include: an aft thermal isolator located between the turbine shaft disc and the transfer tube, the aft thermal isolator being configured to block or reduce a flow of heat from the turbine shaft disc to the transfer tube.

In addition to one or more of the features described above, or as an alternative, further embodiments may include: a nut configured to secure the turbine shaft to the blower; and a forward thermal isolator located between the blower and the nut, the forward thermal isolator being configured to block or reduce a flow of heat from the nut to the blower.

In addition to one or more of the features described above, or as an alternative, further embodiments may include a heat shield attached to the aft housing, the heat shield being in a facing spaced relationship with the aft housing, forming a radial cooling channel therebetween.

In addition to one or more of the features described above, or as an alternative, further embodiments may include: a heat shield attached to the aft housing, the heat shield being in a facing spaced relationship with the aft housing, forming a radial cooling channel therebetween. The heat shield at least partially overlaps the plurality of radially outer aft cooling holes to divert the air between the radial cooling channel and the nozzle housing thermal conduction choke.

According to a method of assembling an electrical power generation system is provided. The method includes: inserting an electric generator into a generator cavity of an aft housing, the electric generator including a stator element and a rotor element located radially inward of the stator element; inserting a transfer tube between the stator element and the rotor element; inserting an aft thermal isolator into the transfer tube; inserting a turbine shaft of a turbine radially inward of the rotor element of the electric generator through the aft thermal isolator and transfer tube, the turbine shaft including a turbine shaft disc a turbine thermal conduction choke located between the turbine shaft disc and the turbine, the turbine thermal conduction choke having a smaller outer diameter than remaining portions of the turbine shaft, the turbine shaft disc, and the turbine, and the aft thermal isolator being located between the transfer tube and the turbine shaft disc; inserting a blower onto the turbine shaft; inserting a forward thermal isolator onto the turbine shaft; and securing the turbine shaft and the blower together using a nut, the forward thermal isolator being located between the nut and the blower.

In addition to one or more of the features described above, or as an alternative, further embodiments may include: forming an inner turbine cavity in the aft housing; forming a nozzle housing thermal conduction choke in the aft housing; forming a plurality of radially inner aft cooling holes in the aft housing, the plurality of radially inner aft cooling holes fluidly connect the generator cavity to the inner turbine cavity; and forming a plurality of radially outer aft cooling holes in the aft housing, the plurality of radially outer aft cooling holes fluidly connect the generator cavity to the nozzle housing thermal conduction choke.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The embodiments of the method and apparatus detailed herein relate to a turbine thermal isolation system for a micro-turbine alternator. A turbine of a micro-turbine alternator is driven by hot gas from the decomposition chamber. This hot gas will quickly heat the turbine. The permanent magnets associated with an electric generator of the micro-turbine alternator need to be protected from the heat to prevent demagnetization. Embodiments disclosed herein seek to thermally isolate the electric generator from heat of the turbine utilizing forced air cooling and ceramic thermal isolators.

Figure 1:
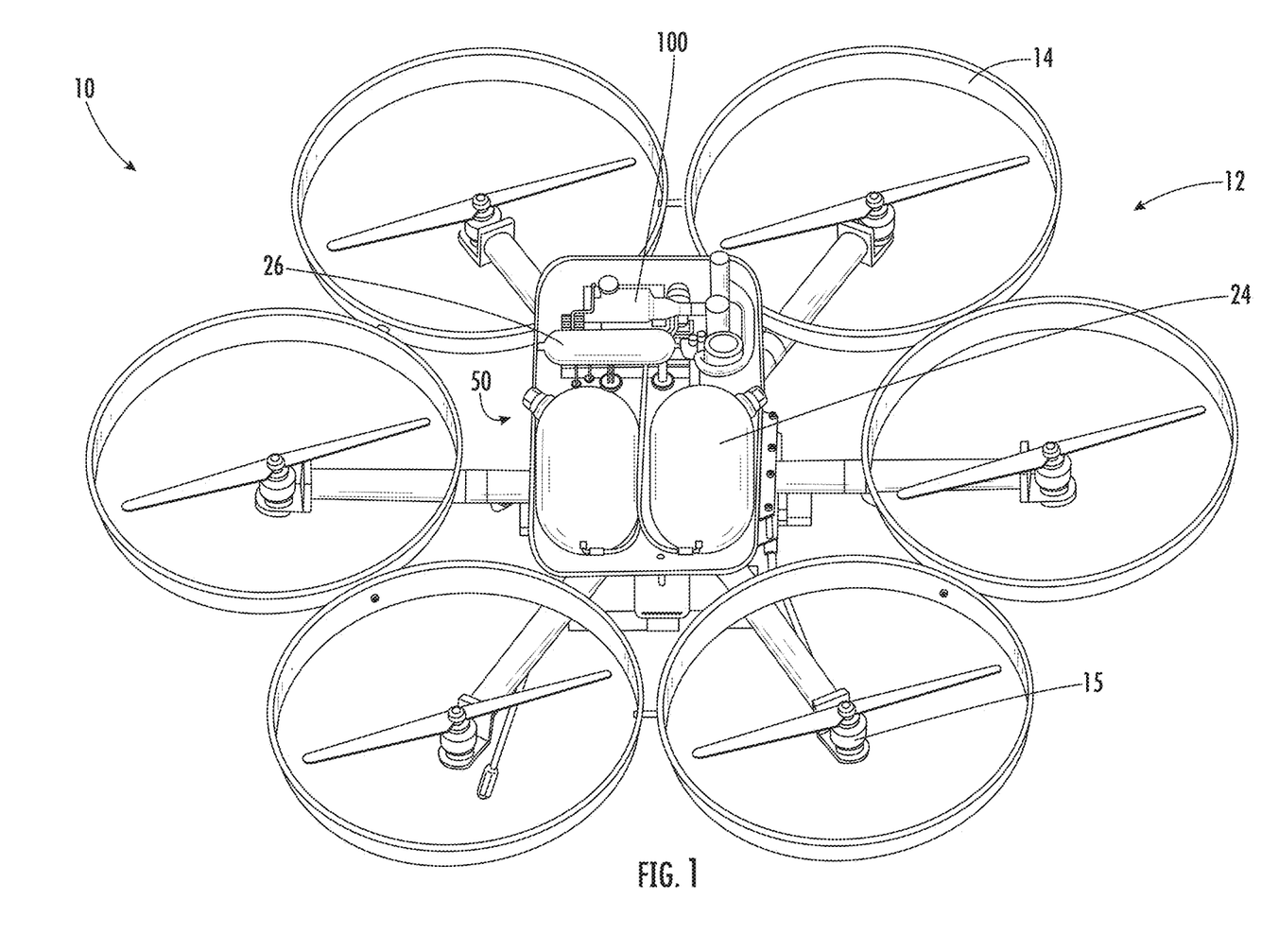
FIG. 1 is an isometric view of an unmanned aerial vehicle including a power generation system, according to an embodiment of the present disclosure.

Referring to FIG. 1, an isometric view of an unmanned aerial vehicle (UAV) 10 is illustrated in accordance with an embodiment of the present disclosure. The UAV 10 includes a propulsion/lift system 12, for example a plurality of lift rotors 14, operably connected to an electrical power generation system 50, which includes a micro-turbine alternator system 100. In an embodiment, the micro-turbine alternator system 100 is a high efficiency Brayton cycle micro-turbine alternator. The UAV 10 includes a propulsion system having electric motors 15 and lift rotors 14 associated with each electric motor 15. Each lift rotor 14 is operably connected to the electric motor 15 that is configured to rotate the lift rotor 14 using electrical power generated by the micro-turbine alternator system 100 of the electrical power generation system 50. The micro-turbine alternator system 100 is configured to convert fuel to electrical power to power at least the electric motors 15 of the lift rotors 14. The fuel is provided from one or more fuel storage tanks 24 operably connected to the micro-turbine alternator system 100. In some embodiments, the fuel utilized is JP-8. The micro-turbine alternator system 100 may utilize compressed air provided from a compressed air tank 26 at 4500 pounds per square inch gauge (psig0 and regulated to about 750 psig. The compressed air from the compressed air tank 26 of FIG. 1 may be utilized to provide the motive pressure required to drive the liquid fuel through a turbine speed control valve (not shown) and into a decomposition chamber. Alternatively, an electric driven pump may be used in place of the compressed air. It is understood that while a decomposition chamber is illustrated and described, the embodiments disclosed herein may be applicable to micro-turbine alternator systems having combustion chambers.

Figure 2:
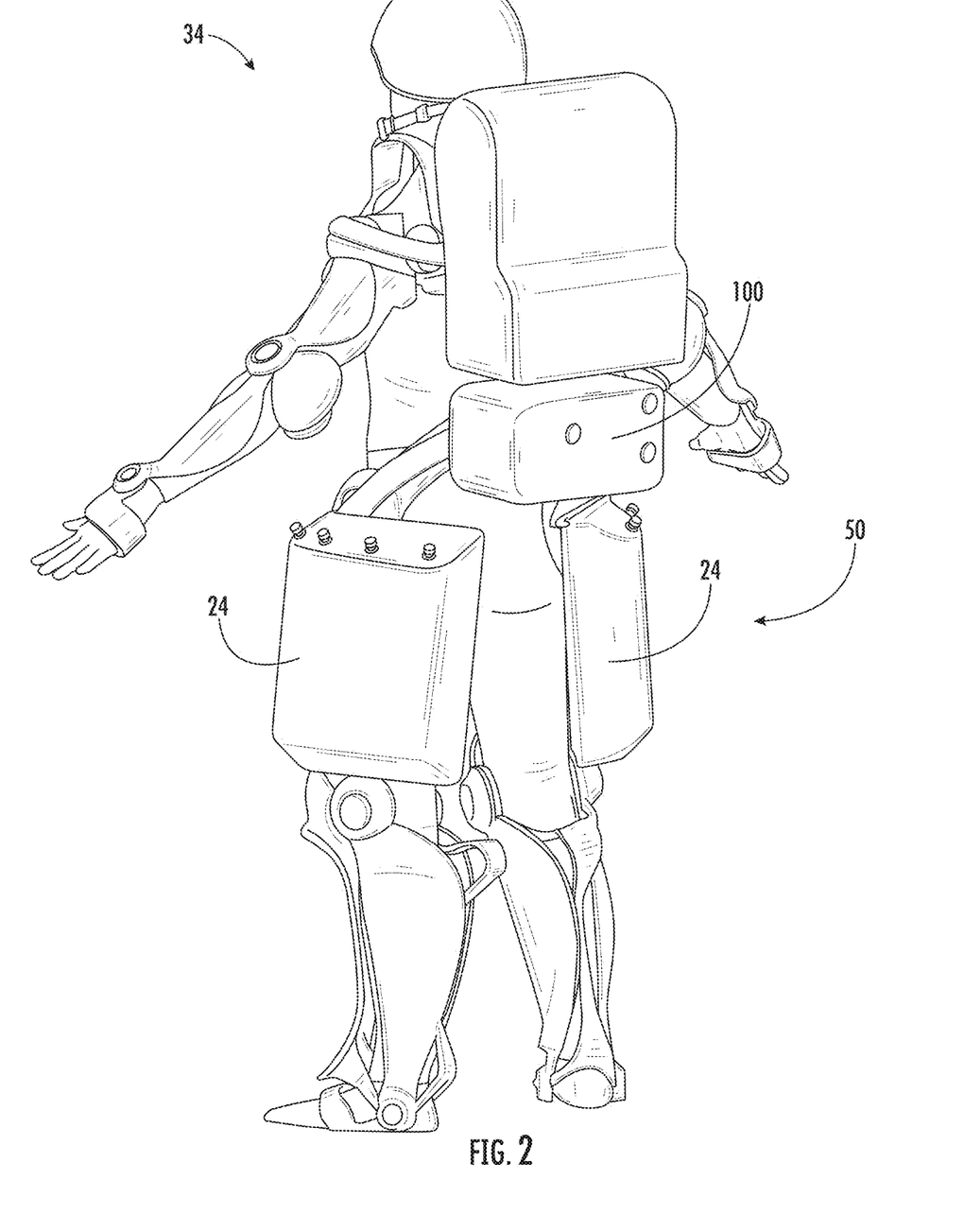
FIG. 2 is an isometric view of a powered suit including a power generation system, according to an embodiment of the present disclosure.

Referring now to FIG. 2, with continued reference to FIG. 1, an isometric view of an electrically-powered suit 34 is illustrated in accordance with an embodiment of the present disclosure. While in FIG. 1, the micro-turbine alternator system 100 is described as utilized in a UAV 10, the micro-turbine alternator system 100 disclosed herein may be readily applied to other systems, and may be utilized in, for example, an electrically-powered suit 34, as shown in FIG. 2.

The electrically-powered suit 34 is operably connected to an electrical power generation system 50, which includes a micro-turbine alternator system 100. The micro-turbine alternator system 100 is configured to convert fuel to electrical power to power the electrically-powered suit 34. The fuel is provided from one or more fuel storage tanks 24 operably connected to the micro-turbine alternator system 100. In some embodiments, the fuel utilized is JP-8. The fuel storage tanks 24 may be located on legs of the electrically-powered suit 34, as illustrated in FIG. 2.

It is understood that the micro-turbine alternator system 100 is not limited to a UAV 10 and an electrically-powered suit 34 application, and the micro-turbine alternator system 100 may be applied to other systems not disclosed herein.

Figure 3:
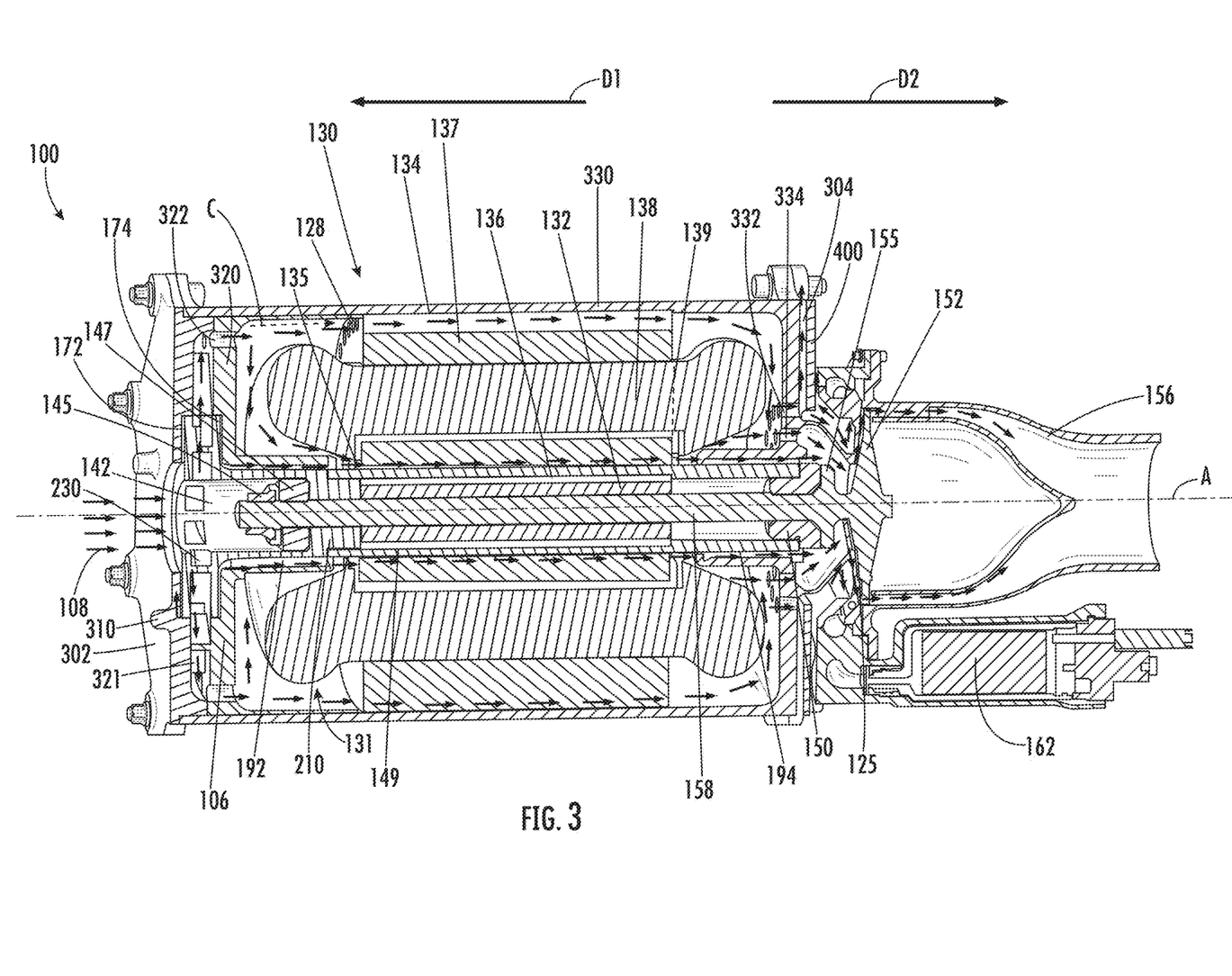
FIG. 3 is an isometric cut-away view of a micro-turbine alternator for use in the power generation system of FIGS. 1 and 2, according to an embodiment of the present disclosure.

Referring now to FIG. 3, an isometric cut-away view of the micro-turbine alternator system 100 is illustrated, in accordance with an embodiment of the present disclosure. The micro-turbine alternator system 100 includes a blower 142 and a turbine 152. The blower 142 and the turbine 152 are oriented along a central longitudinal axis A of the micro-turbine alternator system 100. The micro-turbine alternator system 100 also includes an electric generator 130 located between the blower 142 and the turbine 152 as measured along the central longitudinal axis A.

Advantageously, by locating the electric generator 130 between the blower 142 and the turbine 152, the overall physical size of the micro-turbine alternator system 100 is reduced. As a result, the micro-turbine alternator system 100 according to one or more embodiments may be used in a UAV 10, an electrically-powered suit 34, or another system that benefits from untethered, lightweight power generation.

The micro-turbine alternator system 100 also includes an alternator stator cooling heat exchanger 128 configured to utilize airflow from the blower 142 to cool the electric generator 130. The alternator stator cooling heat exchanger 128 may encircle or enclose the electric generator 130 and may be configured to pass airflow from the blower 142 through or around the electric generator 130. Advantageously, by locating the electric generator 130 between the blower 142 and the turbine 152, moderately cool air in the core flow path C from the blower 142 is forced through the alternator stator cooling heat exchanger 128 and heat may be drawn out of the electric generator 130 and to the airflow within the alternator stator cooling heat exchanger 128.

The electric generator 130 may be a permanent magnet alternator, an induction generator, a switched reluctance generator, a wound field generator, a hybrid generator, or any other type of alternator known to one of skill in the art. As illustrated in FIG. 3, the electric generator 130 may be a permanent magnet alternator that includes a rotor element 132 and a stator element 134 radially outward from the rotor element. In other words, the rotor element 132 is located radially inward from the stator element 134 as measured relative to the central longitudinal axis A. It is understood that the embodiments disclosed herein may be applicable to a rotor element 132 that is located radially outward from the stator element 134. The rotor element 132 may be rotated around the central longitudinal axis A to generate electricity.

The rotor element 132 includes an annular base member 135 and an annular array of permanent magnets 136 that are respectively coupled to an outer diameter of the annular base member 135. The rotor element 132 may include a magnet retention band that fits over an outer diameter of the permanent magnet 136, and keeps the permanent magnet 136 on the rotating annular base member 135. In accordance with further embodiments, the stator element 134 includes a hub 137, a plurality of spokes 139 extending radially inward from the hub 137 and conductive elements 138 that are wound around the spokes 139 to form windings. When the rotor element 132 is rotated around the central longitudinal axis A, a rotating flux field is generated by the permanent magnets 136 and this rotating flux field generates an alternating current in the conductive elements 138 to generate electricity for use by the UAV 10 of FIG. 1 or the electrically-powered suit 34 of FIG. 2.

The micro-turbine alternator system 100 includes a decomposition chamber 162, in which a mono-propellant is decomposed, with the decomposition products utilized to drive the electric generator 130. In some embodiments, the fuel utilized in the decomposition chamber 162 is AF-M315E or Hydrazine. The micro-turbine alternator system 100 converts the energy of the decomposition products into electrical power by urging the decomposition products through the turbine 152, which are operably connected to and configured to rotate the rotor element 132 of the electric generator 130. The electrical energy generated by the electric generator 130 may then be rectified via a generator rectifier (not shown) and utilized by the propulsion/lift system 12 of FIG. 1 or the electrically-powered suit 34 of FIG. 2. The compressed air from the compressed air tank 26 of FIG. 1 may be utilized to provide the motive pressure required to drive the liquid fuel through a turbine speed control valve (not shown) and into the decomposition chamber 162.

The blower 142 is located forward of the turbine 152 as measured along the central longitudinal axis A. In other words, the turbine 152 is located aft of the blower 142 as measured along the central longitudinal axis A. The forward direction D1 and the aft direction D2 are illustrated in FIG. 3.

The micro-turbine alternator system 100 includes a blower shaft 210 oriented along and co-axial to the central longitudinal axis A. The blower shaft 210 may be attached or operably connected to the blower 142. The micro-turbine alternator system 100 includes a turbine shaft 158 oriented along and co-axial to the central longitudinal axis A. In an embodiment, the turbine shaft 158 is a tie bolt and is used to compress a rotating group of components including the blower 142, transfer tube 149, the blower shaft 210, a forward journal bearing 192, and a second journal bearing 194 in the axial direction, causing the multi-segment shaft to act as a single stiff shaft. The turbine shaft 158 may secure to the blower shaft 210 using a nut 145 and a forward thermal isolator 147. The turbine shaft 158 may be attached or operably connected to the turbine 152. The forward thermal isolator 147 may be located between the nut 145 and the blower. The forward thermal isolator 147 may be configured to block or reduce a flow of heat between the nut 145 and the blower 142.

The blower shaft 210 extends in the aft direction D2 away from the blower 142. The turbine shaft 158 extends in the forward direction D1 away from the turbine 152 and through the electric generator 130 to operably connect to the blower shaft 210. In an embodiment, the turbine shaft 158 is located radially inward of the rotor element 132.

The turbine shaft 158 passes through the electric generator 130 to attach to the blower 142. The turbine shaft 158 passes through a rotor element 132 of the electric generator 130 to attach to the blower 142.

The turbine shaft 158 and the blower shaft 210 are configured to rotate in unison. Thus, when decomposition chamber exhaust from the decomposition chamber 162 drives rotation of the turbine 152, the blower shaft 210 rotates. The rotation of the blower shaft 210 drives rotation of the blower 142.

The blower shaft 210 and the turbine shaft 158 are coaxial and rotate via the bearing systems about the central longitudinal axis A, which is colinear with their longitudinal axes. The bearing system includes a forward journal bearing 192 located between the blower 142 and the housing 106 of the micro-turbine alternator system 100. The bearing system includes a second journal bearing 194 located between the transfer tube 149 and the housing 106 of the micro-turbine alternator system 100.

Advantageously, locating the electric generator 130 between the blower 142 and the turbine 152 provides for very effective bearing placement around the blower shaft 210 and transfer tube 149, which increases the stiffness of the combination of the blower shaft 210, transfer tube 149, and turbine shaft 158. The increased stiffness of this combination of rotating components allows for an increase in the critical speed of the turbine shaft 158.

Also, advantageously, by locating the electric generator 130 between the blower 142 and the turbine 152, the alternator stator cooling heat exchanger 128 helps reduce the operating temperature of the electric generator 130, while the airflow through the alternator stator cooling heat exchanger 128 also experiences a pressure drop. This pressure drop through the alternator stator cooling heat exchanger 128 forces some of the airflow from the blower 142 through the rotor element 132 and to a stator gap between the rotor element 132 and the stator element 134, which provides cooling air to the rotor element 132, the forward journal bearing 192, and the second journal bearing 194.

The transfer tube 149 is located radially outward of the rotor element 132 and radially inward of a stator element 134 of the electric generator 130. The transfer tube 149 extends between the blower 142 and the turbine shaft disc 155. The transfer tube 149 extends from the blower 142 through the electric generator 130 to the turbine shaft disc 155. The transfer tube 149 is co-axial with the electric generator 130. The rotor element 132 with the annular base member 135 and the annular array of permanent magnets 136 are located radially inward of the transfer tube 149 measured relative to the central longitudinal axis A. The stator element 134 with the hub 137, the conductive elements 138, and the spokes 139 are located radially outward of the transfer tube 149 as measured relative to the central longitudinal axis A.

The turbine 152 may include rows of rotor assemblies (shown schematically) that carry airfoils that extend into the core flow path C. For example, the turbine 152 can carry a plurality of rotating blades 125. The blades 125 of the turbine 152 extract energy (in the form of pressure) from the core airflow that is communicated through the micro-turbine alternator system 100 along the core flow path C.

The blower 142 may include rows of rotor assemblies (shown schematically) that carry airfoils that extend into the core flow path C. For example, the blower 142 can carry a plurality of rotating blower blades 230. The blower blades 230 of the blower 142 convert rotational mechanical energy (in the form of torque and rotational speed) into pneumatic energy (in the form of pressure) from the core airflow that is communicated through the micro-turbine alternator system 100 along the core flow path C.

The micro-turbine alternator system 100 may also include a first forward thrust bearing 172 and a second forward thrust bearing 174 aft of the first forward thrust bearing 172. The first forward thrust bearing 172 is located between the blower 142 and the housing 106. The second forward thrust bearing 174 is located between the blower 142 and the housing 106.

The housing 106 as illustrated in FIG. 3 at least partially encloses the electric generator 130 to help protect the electric generator 130 from hot gas from the decomposition chamber 162 and the external environment.

The housing 106 may be composed of one or more components. The housing 106 include a forward housing end 302 and an aft housing end 304. The housing 106 as illustrated in FIG. 3 is composed of a forward cap 310 located at the forward end 304, a after housing 330 located at the aft housing end 304, and a forward housing 320 interposed between the forward cap 310 and the aft housing 330. A heat shield 400 may be attached to the after housing 330 at the aft housing end 304 to provide further protection for the housing 106 from radiant heat released by nozzle housing 344.

The forward housing 320 aligns with the after housing 330 to enclose the electric generator 130 in a generator cavity 131. The forward cap 310 is attached to the forward housing 320 proximate or at the forward housing end 302 of the housing 106. The forward cap 310 is in a facing spaced relationship with the forward housing 320 forming a radial air passage 321 therebetween. The radial air passage 321 is configured to receive air 108 from the blower 142.

The forward housing 320 includes a plurality of forward cooling holes 322 that fluidly connect the radial air passage 321 to the generator cavity 131. The plurality of forward cooling holes 322 may be arranged in a circle that circumferentially extend around the central longitudinal axis A.

Air 108 entering the generator cavity 131 from the forward cooling holes 322 is configured to flow through the alternator stator cooling heat exchanger 128, which passes air through and/or around the stator element 134. Additionally, air 108 entering the generator cavity 131 from the forward cooling holes 322 is configured to flow between the stator element 134 and the transfer tube 149. Advantageously, the forward cooling holes 322 may be appropriately sized to produce a pressure drop that will force a first selected portion of the air 108 to flow through the alternator stator cooling heat exchanger 128, and a second selected portion of the air 108 through a gap between the rotor element 132 and the stator element 134. The forward cooling holes 322 and the gap between the rotor element 132 and the stator element 134 may need to be specifically sized to ensure the correct flow split.

Air 108 may also enter the generator cavity 131 by flowing between the blower 142 and the forward housing 320 through the forward journal bearing 192, which advantageously helps provide cooling to the forward journal bearing 192. The forward journal bearing 192 is a gas lubricated journal bearing. The radial air passage 321 is fluidly connected to the generator cavity 131 through the forward journal bearing 192. Advantageously, the forward cooling holes 322 may be appropriately sized to regulate how much air 108 flows into the generator cavity 131 through the forward cooling holes 322 versus the forward journal bearing 192.

After flowing through and/or around the electric generator 130, air 108 may exit the generator cavity 131 through a plurality of radially inner aft cooling holes 334 and/or a plurality of radially outer aft cooling holes 332. The plurality of radially inner aft cooling holes 334 are located radially inward of the plurality of radially outer aft cooling holes 332. The plurality of inner aft cooling holes 334 may be arranged in a circle that circumferentially extends around the central longitudinal axis A. The plurality of outer aft cooling holes 334 may be arranged in a circle that circumferentially extends around the central longitudinal axis A.

Air 108 may also leave the generator cavity 131 by flowing between the transfer tube 149 and the after housing 330 through the second journal bearing 194, which advantageously helps provide cooling to the second journal bearing 194. The second journal bearing 194 is a gas lubricated journal bearing. The inner turbine cavity 340 is fluidly connected to the generator cavity 131 through the second journal bearing 194.

Figure 4:
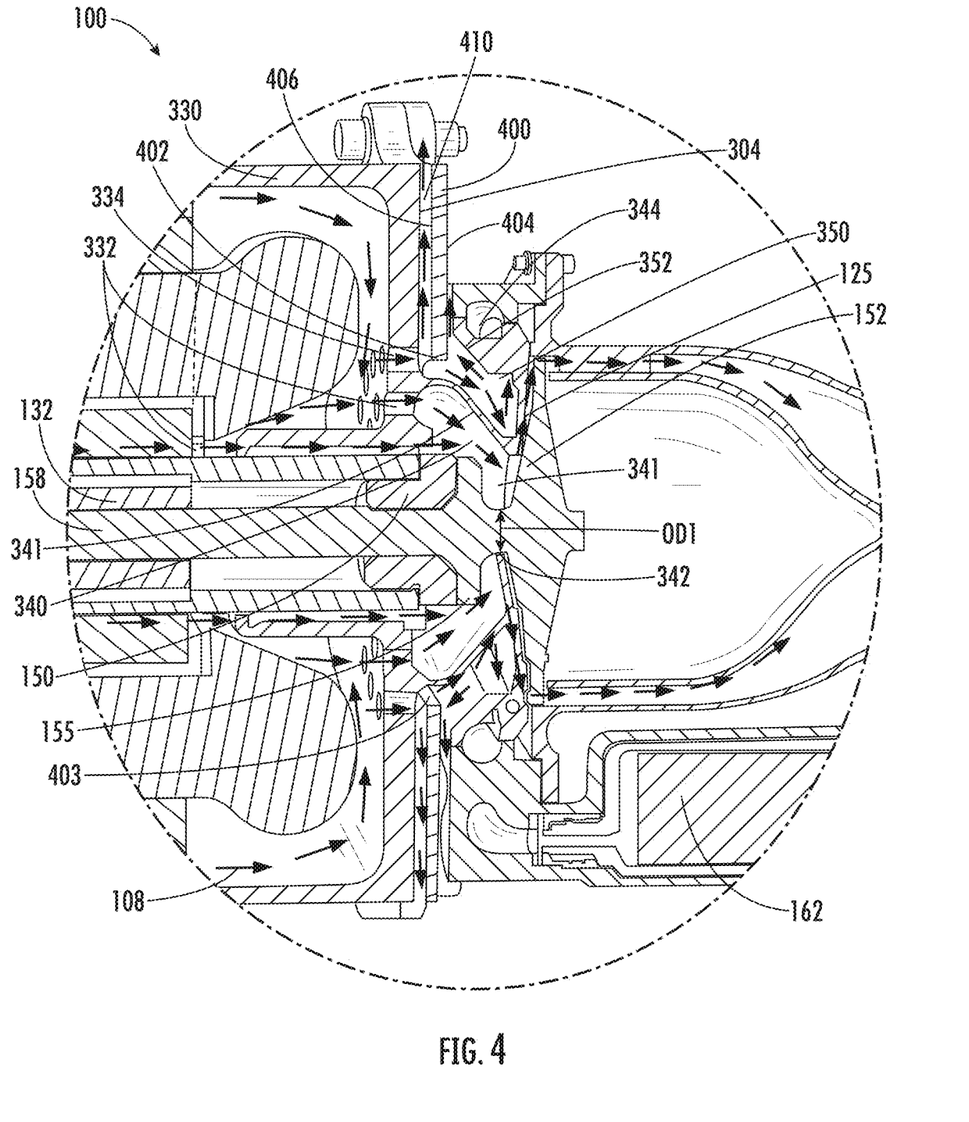
FIG. 4 is an enlarged isometric cut-away view of a micro-turbine alternator of FIG. 3, according to an embodiment of the present disclosure.

Referring now to FIG. 4, with continued reference to FIGS. 1-3, an enlarged isometric cut-away view of the micro-turbine alternator system 100 is illustrated, in accordance with an embodiment of the present disclosure.

Air 108 exiting the generator cavity 131 from the plurality of radially inner aft cooling holes 334 and the second journal bearing 194 may enter an inner turbine cavity 340 shaped to direct air 108 into blades 125 of the turbine 152 and/or towards a turbine neck cavity 341. The turbine neck cavity 341 is an inlet formed by the turbine 152, the turbine shaft disc 155, and the turbine thermal conduction choke 342.

The turbine thermal conduction choke 342 is a recessed portion of the turbine shaft 158 located between the turbine shaft disc 155 and the turbine 152. The turbine thermal conduction choke 342 has a smaller outer diameter OD1 than remaining portions of the turbine shaft 158, the turbine shaft disc 155, and the turbine 152. Advantageously, this smaller outer diameter reduces the conduction area between the turbine 152 and the turbine shaft disc 155, which helps prevent thermal energy from transferring past the turbine thermal conduction choke 342 into the portion of the turbine shaft 158 radially inward of the rotor element 132.

Additionally, air 108 is funneled into the turbine neck cavity 341, where the air 108 may absorb heat from the turbine 152, the turbine shaft disc 155, and the turbine thermal conduction choke 342, thus increase surface area cooling. The inner turbine cavity 340 is shaped to direct the air 108 into the turbine neck cavity 341.

Advantageously, by shaping the inner turbine cavity 340 to constrict radially as moving from left-to-right in FIG. 4, an impingement surface 341 is formed for the air 108, which is travelling in the axial direction as it passes through the radially outer aft cooling holes 332. Axially flowing air 108 strikes the wall, and is directed radially inward. As the air strikes the impingement surface 341 to produce impingement cooling, rather than forced convection along the impingement surface 341.

An aft thermal isolator 150 is located between the transfer tube 149 and the turbine shaft disc 155. The after thermal isolator 150 is used to block or reduce the flow of heat from the turbine shaft disc 155 to the transfer tube 149. The aft thermal isolator 150 is also located between the transfer tube 149 and the turbine shaft 158 to block the flow of heat from the turbine shaft 158 to the transfer tube 149. The aft thermal isolator 150 may be a ceramic thermal isolator.

Air 108 exiting the generator cavity 131 from the plurality of radially outer aft cooling holes 332 may enter a nozzle housing thermal conduction choke 350. The nozzle housing thermal conduction choke 350 is fluidly connected to the plurality of radially outer aft cooling holes 332.

The nozzle housing thermal conduction choke 350 is shaped to direct at least a portion of the air 108 from the plurality of radially outer aft cooling holes 332 to flow across a wall 352 of the nozzle housing thermal conduction choke 350 that abuts the turbine nozzle housing 344 and is thermally connected to the turbine nozzle housing 344. The wall 352 may be a thin section of the nozzle housing thermal conduction choke 350 that connects the nozzle housing thermal conduction choke 350 to the nozzle housing 344. This wall 352 may be specially shaped to increase its surface area and its cooling air impingement area, which helps to dissipate thermal energy from the nozzle housing 344 before it can be conducted to the electric generator housing 130.

The heat shield 400 may be in a facing spaced relationship with the aft housing 330 forming an aft radial cooling channel 410 therebetween. The heat shield 400 may at least partially overlap the plurality of radially outer holes 332 to divert air between the radial cooling channel 410 and the nozzle housing thermal conduction choke 350.

The heat shield 410 include a forward side 406 and an aft side 404. The forward side 406 abuts the radial cooling channel 410. The heat shield 410 may be disc shaped with an inner hole 402 at its center, extending from the forward side 406 to the aft side 404. The radially inner edge 403 of the heat shield 400 that forms the inner hole 402 be located such that it interjects into an airflow path of air 108 exiting the radially outer aft cooling holes 332, which advantageously diverts a first portion of the air 108 from the radially outer aft cooling holes 332 to the radial cooling channel 410 and a second portion of the air 108 from the radially outer aft cooling holes 332 to the nozzle housing thermal conduction choke 350. Air 108 flowing across the radial cooling channel 410 provides film cooling to the heat shield 410 and helps prevent heat migrating into the aft housing 330. Air 108 may exit the nozzle housing thermal conduction choke 352 and provide addition film cooling across the aft side 404 of the heat shield 400.

Figure 5:
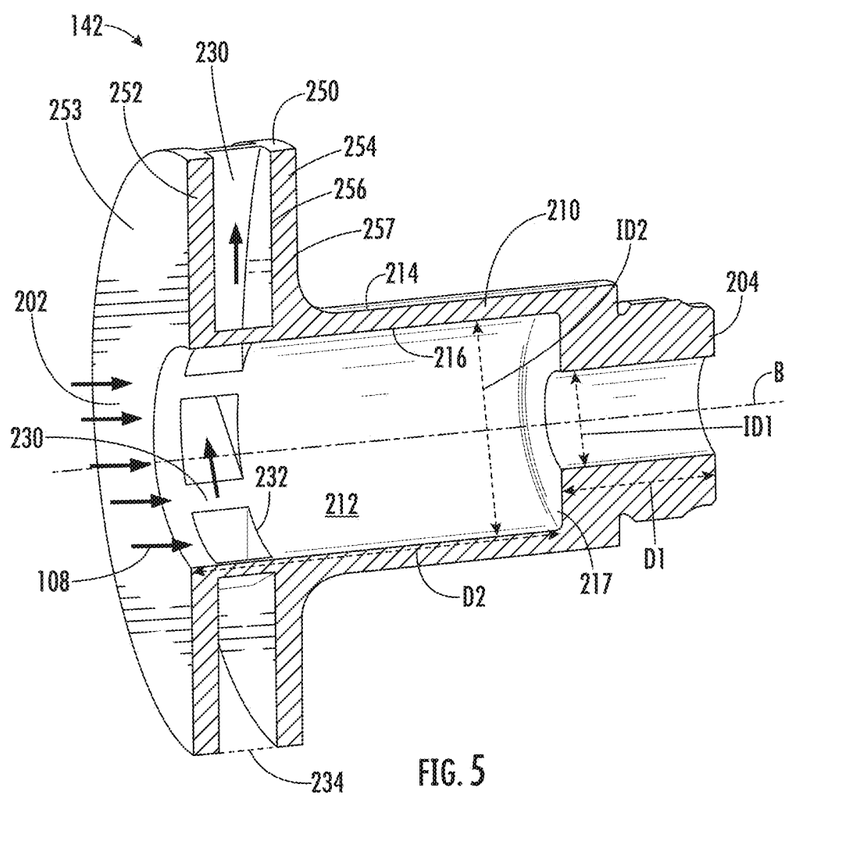
FIG. 5 is an enlarged isometric side cut-away view of a blower of the micro-turbine alternator of FIG. 3, according to an embodiment of the present disclosure.
Figure 6:
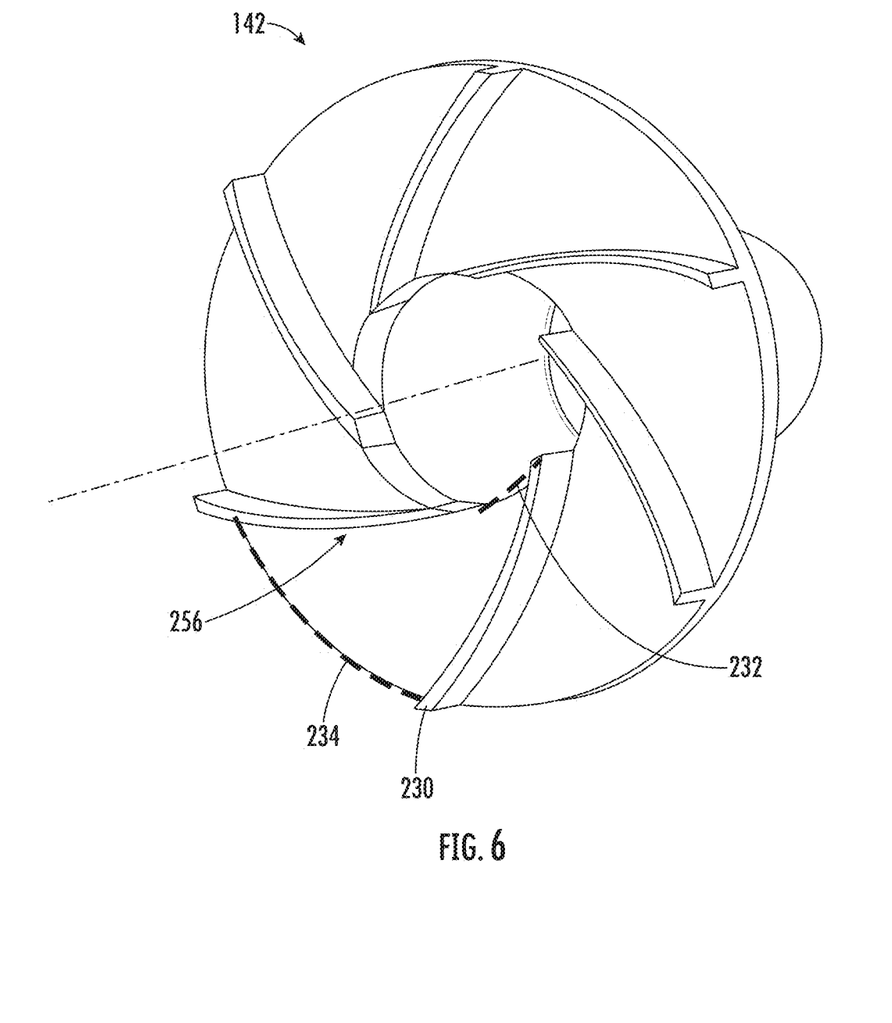
FIG. 6 is an enlarged isometric axial cut-away view of a blower of the micro-turbine alternator of FIG. 3, according to an embodiment of the present disclosure.

Referring now to FIGS. 5 and 6, with continued reference to FIGS. 1-4, an isometric side cutaway view of the blower 142 is illustrated in FIG. 5 and an isometric axial cutaway view of the blower 142 is illustrated in FIG. 6, in accordance with an embodiment of the present disclosure.

The blower 142 extends from a forward end 202 to an aft end 204. The aft end being located opposite of the forward end 202, as illustrated in FIG. 5. When installed in the micro-turbine alternator system 100 of FIG. 3, the forward end 202 is located forward of the aft end 204, as measured along the central longitudinal axis A. In other words, the aft end 204 is located aft of the forward end 202, as measured along the central longitudinal axis A.

The blower 142 includes a blower shaft 210 at the aft end 204 and a flange 250 at the forward end 202. The blower shaft 210 extends from the aft end 204 to the flange 250 and the flange 250 extends from the forward end 202 to the blower shaft 210. The blower shaft 210 is coaxial to a blower longitudinal axis B. The blower shaft 210 rotates about the blower longitudinal axis B. When the blower 142 is installed within the micro-turbine alternator system 100 of FIG. 3, the blower longitudinal axis B is colinear with the central longitudinal axis A. In other words, the blower longitudinal axis B and the central longitudinal axis A are the same axis when the blower 142 is installed within the micro-turbine alternator system 100 of FIG. 3.

The blower 142 includes an external surface 214 and an internal surface 216. The external surface 214 is radially outward from the internal surface 216. The blower 142 includes an axial passageway 212 formed therein. The axial passageway 212 is located at the forward end 202 and extends into the blower 142. The internal surface 216 defines the axial passageway 212 that extends from the forward end 202 to the aft end 204. An inner diameter ID1, ID2 of the passageway may vary in size between the forward end 202 and the aft end 204. The axial passageway 212 is coaxial with the blower longitudinal axis B. The axial passageway 212 may be tubular in shape and configured to fit the turbine shaft 158 (See FIG. 3). In other words, the turbine shaft 158 is configured to fit within the axial passageway 212.

A seat 217 is interposed in the axial passageway 212 between the aft end 204 and the forward end 202. The axial passageway 212 has a first inner diameter ID1 from the aft end 204 to the seat 217 and a second inner diameter ID2 from the forward end 202 to the seat 217. The first inner diameter ID1 is less than the second inner diameter ID2. The seat 217 provides a surface for the thermal isolator 147 to rest upon when the nut 145 is secured to the turbine shaft 158, thus interlocking the blowers 142 and the turbine 152 together.

The flange 250 includes a forward disc 252 and an aft disc 254. The forward disc 252 is located at the forward end 202 and the aft disc 254 is connected to the blower shaft 210. The aft disc 254 may be attached to the forward disc 252 through one or more blower blades 230.

The blower 142 includes a plurality of blades 230 circumferentially encircling the internal surface 216. Each of the plurality of blades 230 extend from the internal surface 216 to the external surface 214. The blades 230 of the blower 142 transfer mechanical energy of the rotating shaft into pneumatic energy in the fluid stream (in the form of dynamic pressure) by blown and accelerating the airflow in the core airflow path C. The blades 230 may be contoured between the internal surface 216 to the external surface 214 to appropriately blow and accelerate the airflow in the core airflow path C as required.

The blower blades 230 extend from the forward disc 252 to the aft disc 254. The blower blades 230 may extend from the internal surface 216 to the external surface 214. The forward disc 252 and the aft disc 254 are in a facing spaced relationship partially at least partially defining a radial passageway 256 therebetween.

Radial passageways 256 are defined between the forward disc 252, the aft disc 254, and the blower blades 230. Each radial passageways 256 includes a blower inlet 232 in the internal surface 216 and a blower outlet 234 in the external surface 214 of the flange 250. Each radial passageway 256 is fluidly connected to the axial passageway 212.

Air 108 is drawn into the blower 142 through the axial passageway 212 at the forward end 202, then from the axial passageway 212 the air 108 is drawn through the blower inlet 232 into the radial passageways 256 and then out of the radial passageways 256 through the outlet 234. Advantageously, by pulling air 108 through the axial passageway formed within the blowers 142, the air 108 cools the blower 142, while being blown.

The blower 142 is a monolithic structure rather than being assembled from separate individually formed components that are then assembled. The term monolithic may be defined as an object that is cast or formed as single piece without joints or seams. In other words, the blower 142 is formed as a single piece comprising a unitary structure. In an embodiment, the blower 142 has no joints or seams. The blower 142 may be manufactured or formed via additive manufacturing. Additive manufacturing may include, but is not limited to 3D printing, laser powder bed fusion (L-PBF) additive manufacturing, investment casting (using the rapid prototype method) or any other additive manufacturing technique known to one of skill in the art.

The first forward thrust bearing 172 is located between a forward surface 253 of the forward disc 252 and the housing 106. The second forward thrust bearing 174 is located between an aft surface 257 of the aft disc 254 and the housing 106. The forward journal bearing 192 is located between the external surface 214 and the housing 106 of the micro-turbine alternator system 100.

Figure 7:
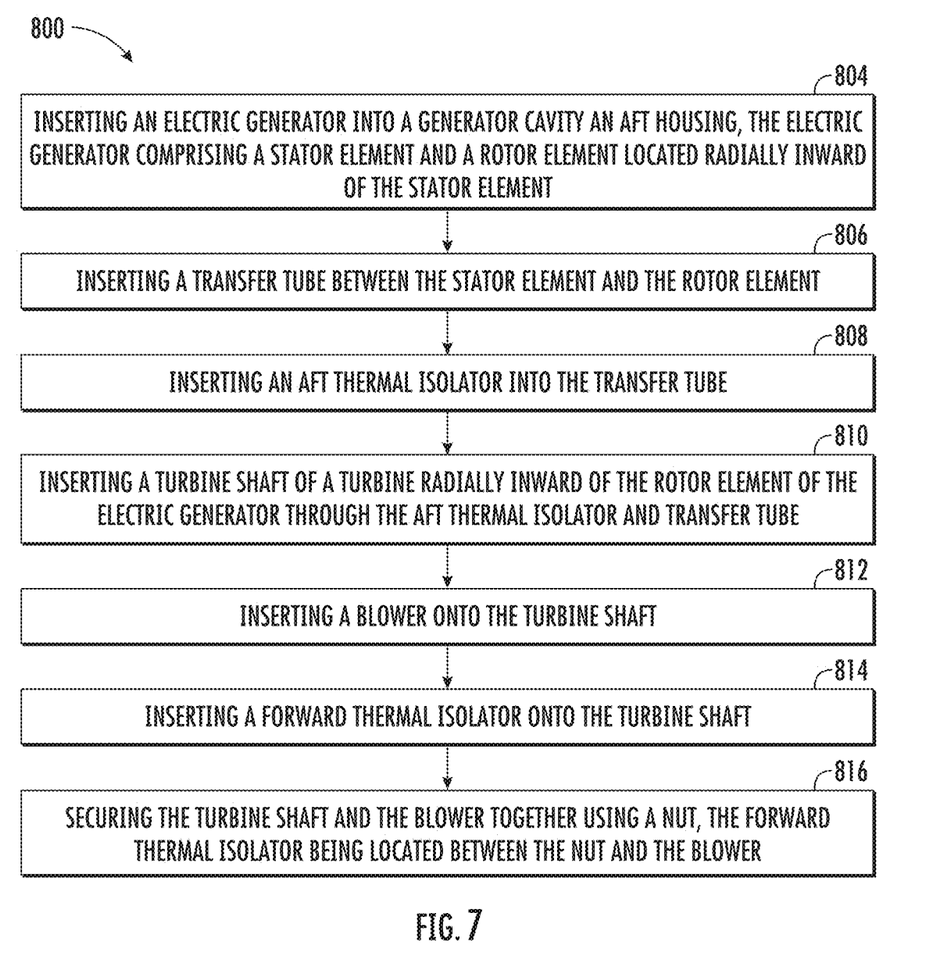
FIG. 7 is a flow diagram illustrating a flow diagram of a method of assembling an electrical power generation system, according to an embodiment of the present disclosure.

Referring now to FIG. 7, with continued reference to FIGS. 1-6, a flow diagram of a method 800 of assembling an electrical power generation system 100 is illustrated in accordance with an embodiment of the present disclosure.

At block 804, an electric generator 130 is inserted into a generator cavity 131 of an aft housing 330. The electric generator 130 includes a stator element 134 and a rotor element 132 located radially inward of the stator element 134. At block 806, a transfer tube 149 is inserted between the stator element 134 and the rotor element 132. At block 808, an aft thermal isolator 150 is inserted into the transfer tube 149.

At block 810, a turbine shaft 158 of a turbine is inserted radially inward of the rotor element 132 the electric generator 130 through the aft thermal isolator 150 and transfer tube 149. The turbine shaft 158 comprising a turbine shaft disc 155 and a turbine thermal conduction choke 342 located between the turbine shaft disc 155 and the turbine 152. The turbine thermal conduction choke 342 has a smaller outer diameter OD1 than remaining portions of the turbine shaft 158, the turbine shaft disc 155, and the turbine. The aft thermal isolator 150 is located between the transfer tube 149 and the turbine shaft disc 155.

At block 812, a blower 142 is inserted onto the turbine shaft 158. At block 814, a forward thermal isolator 147 is inserted onto the turbine shaft 158.

At block 816, the turbine shaft 158 and the blower 142 are secured together using a nut 145, for example. The forward thermal isolator 147 being located between the nut 145 and the blower 142.

The method 800 may further include that an inner turbine cavity 340 is formed in the aft housing 330 and a nozzle housing thermal conduction choke 350 is formed in the aft housing 330. The method 800 may also include forming a plurality of radially inner aft cooling holes 334 in the aft housing 330. The plurality of radially inner aft cooling holes 334 fluidly connect the generator cavity 131 to the inner turbine cavity 340. The method 800 may yet also include that a plurality of radially outer aft cooling holes 332 is formed in the aft housing 330. The plurality of radially outer aft cooling holes 332 fluidly connect the generator cavity 131 to the nozzle housing thermal conduction choke 350.

While the above description has described the flow process of FIG. 7 in a particular order, it should be appreciated that unless otherwise specifically required in the attached claims that the ordering of the steps may be varied.

Technical effects and benefits of the features described herein include isolating an electric generator of a micro-turbine alternator from heat of a turbine using air cooling, thermal isolators, and reducing a diameter of the turbine shaft between the turbine and a turbine shaft located radially inward of the electric generator.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical power generation system, comprising:
   a micro-turbine alternator, comprising:
      a decomposition chamber;
      a turbine comprising blades driven by combustion gases from the decomposition chamber;
      a blower operably connected to the decomposition chamber to provide a blown airflow thereto;
      one or more shafts connecting the turbine to the blower such that rotation of the turbine drives rotation of the blower;
      an electric generator disposed along the one or more shafts such that electrical power is generated via rotation of the one or more shafts; and
      a housing enclosing the electric generator within a generator cavity formed therein, wherein the housing includes forward housing and an aft housing, a forward housing end and an aft housing end and cap at the forward housing end, wherein the forward housing is interposed between the cap and the aft housing, wherein the forward housing and the aft housing align to form the generator cavity;
   wherein the blower is configured to blow air through the generator cavity through or around the electric generator, and
   wherein the air exits configured to exit the generator cavity to enter the turbine;
   wherein the forward cap is in a facing spaced relationship with the forward housing forming a radial air passage therebetween, the radial air passage being configured to receive air from the blower; and
   wherein the aft housing further comprises:
      a plurality of radially inner aft cooling holes; and
      a plurality of radially outer aft cooling holes, radially outward from the plurality of radially inner aft cooling holes.

2. The electrical power generation system of claim 1, wherein the forward housing further comprises a plurality of forward cooling holes, the plurality of forward cooling holes fluidly connect the radial air passage to the generator cavity.

3. The electrical power generation system of claim 1, comprising:
   a forward journal bearing, wherein the radial air passage is fluidly connected to the generator cavity through the forward journal bearing.

4. The electrical power generation system of claim 1, further comprising:
   an inner turbine cavity shaped to direct the air into the blades of the turbine, wherein the inner turbine cavity is fluidly connected to the plurality of radially inner aft cooling holes.

5. The electrical power generation system of claim 4, further comprising:
   a turbine shaft attached to the turbine, the turbine shaft comprising:
      a turbine shaft disc; and
      a turbine thermal conduction choke located between the turbine shaft disc and the turbine, wherein the turbine thermal conduction choke has a smaller outer diameter than remaining portions of the turbine shaft, the turbine shaft disc, and the turbine.

6. The electrical power generation system of claim 5, wherein the turbine, the turbine shaft disc, and the turbine thermal conduction choke form a turbine neck cavity, and wherein the inner turbine cavity is shaped to direct the air into the turbine neck cavity.

7. The electrical power generation system of claim 1, further comprising:
   a turbine nozzle housing;
   a nozzle housing thermal conduction choke fluidly connected to the plurality of radially inner aft cooling holes, the nozzle housing thermal conduction choke including a wall abutting the turbine nozzle housing, wherein the wall is thermally connected to the turbine nozzle housing,
   wherein the nozzle housing thermal conduction choke is shaped to direct at least a portion of the air from the plurality of radially inner aft cooling holes to flow across the wall.

8. The electrical power generation system of claim 4, further comprising:
   a second journal bearing, wherein the inner turbine cavity is fluidly connected to the generator cavity through the second journal bearing.

9. The electrical power generation system of claim 5, wherein the turbine shaft passes through the electric generator to attach to the blower.

10. The electrical power generation system of claim 9, wherein the turbine shaft passes through a rotor element of the electric generator to attach to the blower.

11. The electrical power generation system of claim 10, further comprising a transfer tube located radially outward of the rotor element and radially inward of a stator element of the electric generator, the transfer tube extending between the blower and the turbine shaft disc.

12. The electrical power generation system of claim 11, further comprising: an aft thermal isolator located between the turbine shaft disc and the transfer tube, the aft thermal isolator being configured to block or reduce a flow of heat from the turbine shaft disc to the transfer tube.

13. The electrical power generation system of claim 11, further comprising:
   a nut configured to secure the turbine shaft to the blower; and
   a forward thermal isolator located between the blower and the nut, the forward thermal isolator being configured to block or reduce a flow of heat from the nut to the blower.

14. The electrical power generation system of claim 1, further comprising:

a heat shield attached to the aft housing, the heat shield being in a facing spaced relationship with the aft housing, forming a radial cooling channel therebetween.

15. The electrical power generation system of claim 7, further comprising:
a heat shield attached to the aft housing, the heat shield being in a facing spaced relationship with the aft housing, forming a radial cooling channel therebetween,
wherein the heat shield at least partially overlaps the plurality of radially outer aft cooling holes to divert the air between the radial cooling channel and the nozzle housing thermal conduction choke.

16. A method of assembling an electrical power generation system, the method comprising, sequentially:
inserting an electric generator into a generator cavity of an aft housing, the electric generator comprising a stator element and a rotor element located radially inward of the stator element;
inserting a transfer tube between the stator element and the rotor element;
inserting an aft thermal isolator into the transfer tube;
inserting a turbine shaft of a turbine radially inward of the rotor element of the electric generator through the aft thermal isolator and transfer tube, the turbine shaft comprising a turbine shaft disc a turbine thermal conduction choke located between the turbine shaft disc and the turbine, wherein the turbine thermal conduction choke has a smaller outer diameter than remaining portions of the turbine shaft, the turbine shaft disc, and the turbine, and wherein the aft thermal isolator is located between the transfer tube and the turbine shaft disc;
inserting a blower onto the turbine shaft;
inserting a forward thermal isolator onto the turbine shaft; and
securing the turbine shaft and the blower together using a nut, the forward thermal isolator being located between the nut and the blower.

17. The electrical power generation system of claim 16, further comprising:
forming an inner turbine cavity in the aft housing;
forming a nozzle housing thermal conduction choke in the aft housing;
forming a plurality of radially inner aft cooling holes in the aft housing, the plurality of radially inner aft cooling holes fluidly connect the generator cavity to the inner turbine cavity; and
forming a plurality of radially outer aft cooling holes in the aft housing, the plurality of radially outer aft cooling holes fluidly connect the generator cavity to the nozzle housing thermal conduction choke.

* * * * *